United States Patent [19]
Ukai et al.

[11] Patent Number: 6,057,391
[45] Date of Patent: May 2, 2000

[54] POLYURETHANE RESIN TYPE COMPOSITION FOR SLUSH MOLDING

[75] Inventors: Junzo Ukai, Okazaki; Hideo Nishimura, Toyota; Yoshitsugu Takai; Hideki Ohmori, both of Kyoto; Toshihiko Nakamura; Kazuo Kobayashi, both of Toyota, all of Japan

[73] Assignees: Sanyo Chemical Industries, Ltd., Kyoto-fu; Toyota Jidosha Kabushiki Kaisha, Aichi-ken, both of Japan

[21] Appl. No.: 09/089,345

[22] Filed: Jun. 3, 1998

[30] Foreign Application Priority Data

| Jun. 6, 1997 | [JP] | Japan | 9-165127 |
| Feb. 13, 1998 | [JP] | Japan | 10-048942 |

[51] Int. Cl.⁷ .................. C08J 5/10; C08L 75/04
[52] U.S. Cl. .................. 524/297; 524/497; 524/298; 524/322; 524/145
[58] Field of Search .................. 524/589, 590, 524/296, 298, 497, 284, 417, 127, 145, 322, 297, 303, 306; 528/44

[56] References Cited

U.S. PATENT DOCUMENTS

| 4,985,490 | 1/1991 | Rosthauser et al. | 524/871 |
| 5,077,339 | 12/1991 | Grogler | 525/185 |
| 5,096,993 | 3/1992 | Smith et al. | 528/61 |
| 5,210,127 | 5/1993 | Werner et al. | 524/589 |

FOREIGN PATENT DOCUMENTS

| 53-29705 | 8/1978 | Japan. |
| 59-39464 | 9/1984 | Japan. |
| 60-30688 | 7/1985 | Japan. |
| 5-279485 | 10/1993 | Japan. |
| 810489 | 12/1956 | United Kingdom. |

OTHER PUBLICATIONS

A Method for Estimating Both the Solubility Parameters–and Molar Volumes of Liquids, by Rober F. Fedors, Polymer Engineering and Science, vol. 14, No. 2, pp. 147–153 (1974).

Patent Abstracts of Japan of JP 05043826 A, "Preparation of Powdered Urethane Resin Composition", Feb. 23, 1993, (Abstract Only).

Patent Abstracts of Japan of JP 07133423 A, "Production of Resin Powder", May 23, 1995, (Abstract Only).

*Primary Examiner*—James J. Seidleck
*Assistant Examiner*—U. K Rajguru
*Attorney, Agent, or Firm*—Finnegan, Henderson, Farabow, Garrett & Dunner, L.L.P.

[57] ABSTRACT

A composition suitable for slush molding is disclosed. The composition is mainly comprised of a thermoplastic polyurethane elastomer (A) with a number average molecular weight of 20,000 to 50,000 and a glass transition point of not higher than −35° C., a plasticizer (B), a blocked polyisocyanate (C) and a pigment (D), wherein each of(B), (C) and (D) is respectively contained in a prescribed quantities. The polyurethane-type slush molding composition provides a molded article of low hardness, high elongation at low temperature, and excellent thermal aging resistance and light aging resistance.

19 Claims, No Drawings

POLYURETHANE RESIN TYPE COMPOSITION FOR SLUSH MOLDING

FIELD OF THE INVENTION

The present invention relates to a composition for slush molding, more particularly to a slush molding composition capable of being molded into sheets having excellent durability and a soft touch even at low temperature.

BACKGROUND OF THE INVENTION

Slush molding permits molding without difficulty of complicated forms as undercut, deep drawing or the like, with the skin thickness kept uniform and at a high yield. On the strength of those advantages, the slush molding process has been widely practiced for molding various articles as interior component parts of motor vehicles. In this molding, soft polyvinyl chloride (PVC) powder has mainly been used as exemplified by unexamined Japanese Patent Publication No. H05-279485.

One problem is, however, that because of a high content of a low molecular weight plasticizer, the softened PVC loses its soft feel at temperatures below the solidifying point of the plasticizer. Other problems are encountered in service for a long time: (1) formation of oil film of evaporated plasticizer on the automobile front windshield, (2) loss in matting effect and soft touch as a result of migration of the plasticizer to the surface of the molded article, and (3) yellowing from the degradation of PVC with passage of time.

Efforts have been made to solve those problems, and there are known some improved versions. For example, modifications of PVC with flexible thermoplastic polyurethane resin are proposed as materials to provide soft touch without a low molecular weight plasticizer as disclosed in examined Japanese Patent Publication No. S53-29705, No. S59-39464 and No. S60-30688.

Yet, all those materials are based on PVC, and the fogging problem of molded articles remains to be solved. The automobile interior trims call for a better material than those prior art resins in thermal aging resistance and light aging resistance. The PVC-based materials have failed to satisfy the requirements.

SUMMARY OF THE INVENTION

It is an object of the present invention to provide a composition for slush-molding having improved thermal and light aging resistances. Another object of the present invention is to provide a slush-molded surface skin for automotive instrument panels which retains its soft feel even at low temperatures without degrading with passage of time. It is still another object of the present invention to obtain a surface skin for automobile interior trims possessing a high degree of thermal aging resistance and light aging resistance.

Briefly, these and other object of this invention as hereinafter will become more readily apparent as having been attained broadly a composition for slush-molding, mainly comprised of:

a thermoplastic polyurethane elastomer (A) having a number-average molecular weight of 20,000 to 50,000 and a glass transition point not higher than −35° C., a plasticizer (B), a blocked polyisocyanate (C), and a pigment (D).

(B), (C) and (D) are contained in quantities of 1 to 20 parts by weight, 1 to 20 parts by weight and 0.5 to 3 parts by weight respectively, per 100 parts by weight of (A).

Said elastomer (A) is obtainable by reacting a non-aromatic diisocyanate (a1) with a high molecular weight diol (a2) and optionally a low molecular weight diol (a3), a non-aromatic diamine (a4) and a monoamine (a5) having one or two hydroxyl groups.

The slush molding composition of the present invention gives molded products having the following advantages:

1. Low hardness, therefore excellent feel and hand.

2. High elongation at low temperature as compared with the conventional PVC-type material, and therefore suitable as crack-free surface skin on an instrument panel for use in cold districts. There is no fear of breaking apart when an air bag installed inside the instrument panel for the front seat next to the driver is activated and inflated in the cold season. Thus, the composition of the present invention is useful in protecting the automobile passenger.

3. Excellent in thermal aging resistance, light aging resistance and other properties, and therefore suitable for long-term outdoor use.

On the strength of those advantages, the slush molding composition of the present invention is very useful as automobile interior material, for example, for instrument panel and also applicable to other molded articles such as sofa surface skin and others.

DETAILED DESCRIPTION OF THE INVENTION

The slush molding composition of the present invention is applied in the form of powder. The powder has an average particle diameter of generally 100 to 300 μm.

If powder has an average particle diameter less than 100 μm, then flowability of the powder will be poor, with the powder failing to be introduced into narrow parts of the mold, resulting in faulty molding. With powder having a diameter larger than 300 μm, on the other hand, pin holes can be caused on the molded surface skin.

Another point is that the quantity of the particles with a particle diameter of less than 100 μm in the powder is generally not more than 20 percent by weight, and preferably not more than 10 percent by weight. If the percentage of the particles less than 100 μm in particle diameter exceeds 20 percent by weight, dusting will be caused and the powder will not flow well into the narrow areas in the mold, resulting in faulty molding.

The average particle diameter mentioned here is defined as a value expressed in the sieve opening through which 50 percent of the sample passes as measured by particle size distribution meter, e.g., TUBUTEC manufactured by LASENTEC LTD.

The following methods of preparing the slush molding composition of the present invention are given by way of example, but not limited thereto by any means.

1̂: The powder (A), (B) and (C) are blended in a lump in a mixer.

2̂: (B), (C) and (D) are first blended, and then mixed with the powder (A)

3̂: (A) in powder is obtained in the presence of (B), (C) and (D).

Of those methods, preferable is the method 2̂.

The quantities to be added to (A) of (B), (C) and (D) per 100 parts, by weight, of (A) are: (B) generally 1 to 20 parts by weight, and preferably 5 to 15 parts by weight; (C) generally 1 to 20 parts by weight, and preferably 5 to 15 parts by weight; and (D) generally 0.5 to 5 parts by weight, and preferably 1 to 3 parts by weight.

If (B) is less than 1 part by weight, the melt viscosity in molding will rise, resulting faulty molding. If the addition exceeds 20 parts by weight, on the other hand, (B) ill bleed out on the molded skin surface in a change with passage of time.

The addition of (C) in less than 1 part by weight affects the light resistance and thermal acing resistance, while the use of more than 20 parts by weight results in poor soft feel at low temperature.

If the (D) is less than 0.5 part by weight, the hiding power will be insufficient. With the addition exceeding 5 parts by weight, on the other hand, the molding melt viscosity will rise resulting in faulty molding and increased costs as well.

Powder mixing apparatuses which are used in preparing the slush molding composition of the present invention are not restricted in particular, and known mixers can be used. Among such powder mixing apparatuses are the high-speed shear type as Henschel mixer, and the low-speed type as Nauta mixer and planetary mixer.

The slush molding composition of the present invention can be mixed, as necessary, with known additives as, for example, antiblocking agent, releasing agent, light stabilizer, thermal stabilizer and flame retarder.

Based on the thermoplastic polyurethane elastomer (A), the composition of the present invention can reduce the content of the plasticizer unlike the prior art, thus cutting down the negative effects brought about by use of the plasticizer in a large quantity. Especially if the difference in solubility parameter (hereafter, referred to as "SP") between (A) and the plasticizer (B) is lowered to not larger than 1.5, the compatibility therebetween will improve, with no aforesaid adverse effects caused.

It is noted that the SP can be obtained by procedure described in "Polymer Engineering and Science, Vol. 14, No. 2, p. 147–154 (1974)."

The number average molecular weight (measured by GPC; hereinafter referred to as Mn) of (A) is generally 20,000 to 50,000, and preferably 25,000 to 40,000. If Mn is less than 20,000, the required resin strength can not be obtained. But Mn higher than 50,000 would increase the hot-melt viscosity, affecting the moldability.

The glass transition point (Tg) of (A) is generally not higher than −35° C., and preferably not higher than −40° C. If Tg is higher than −35° C., the surface skin formed of the slush molding composition will lose the soft touch at a low temperature. Tg mentioned here can be determined by differential scanning calorimeter (DSC).

The Shore-A hardness of (A) at 25° C. is generally 55 to 85, and preferably 55 to 75, more preferably 60 to 70. If the Shore-A hardness is kept within that range, a slush molded surface skin well balanced in hand touch and strength can be obtained. The SP of (A) is normally 9 to 11.

Suitable non-aromatic diisocyanates include ①̂ aliphatic diisocyanates with 2 to 12 carbon atoms (except the carbons in the NCO group, similarly hereinafter), e.g., ethylene diisocyanate, tetramethylene diisocyanate, hexamethylene diisocyanate, dodecamethylene diisocyanate, 2,2,4-trimethylhexane diisocyanate, lysine diisocyanate, 2,6-diisocyanato methyl caproate, and the like; ②̂ alicyclic diisocyanates with 4 to 15 carbon atoms, e.g., isophorone diisocyanate(hereinafter referred to as IPDI), dicyclohexylmethane diisocyanate, cyclohexylene diisocyanate, methyl cyclohexylene diisocyanate, and the like; ③̂ araliphatic isocyanate with 8 to 12 carbon atoms, e.g., xylylene diisocyanate, α, α, α', α'-tetramethyl xylylene diisocyanate; ④̂ modified diisocyanates from these, e.g., diisocyanates having a carbodiimide group, an urethodione group, an urethoimine group or an urea group; and ⑤̂ mixtures of two or more of those compounds.

Among these compounds, preferred are alicyclic diisocyanates, particularly IPDI.

Suitable high molecular weight diols (a2) include polyester diols and polyether diols.

As the aforesaid polyester diol can be cited: ①̂ condensation polymerizates between a low molecular weight diol and a dicarboxylic acid; ②̂ ring opening polymerizates of a lactone monomer with a low molecular weight diol as initiator; and mixtures of two or more of those compounds.

The aforesaid low molecular weight diol usually has a molecular weight of 62–about 500. Examples of such diol include: aliphatic diols [linear ones such as ethylene glycol, diethylene glycol, 1,3-propanediol, 1,4-butanediol, 1,5-pentanediol, 1,6-hexanediol, 1,8-octanediol, and the like, branched ones such as propylene glycol, neopentyl glycol, 3-methyl-1,5-pentanediol, 2,2-diethyl-1,3-propanediol 1,2-butanediol, 1,3-butanediol, and 2,3-butanediol]; diols that contain cyclic group such as 1,4-bis(hydroxymethyl) cyclohexane, m-xylylene glycol, and p-xylylene glycol; and mixtures of two or more of those compounds. Of these compounds preferable are branched aliphatic diols, particularly neopentyl glycol.

Examples of the dicarboxylic acid in aforesaid ①̂ include aliphatic dicarboxylic acids such as succinic, adipic, sebacic, glutaric, azelaic, maleic and fumaric acids; aromatic dicarboxylic acids such as terzphthalic and isophthalic acids; and mixtures of two or more of these compounds.

Examples of the lactone in aforesaid ②̂ include γ-butyrolactone, ε-caprolactone, γ-valerola(tone and the like.

As the aforesaid polyether diol can be cited oxyalkylene ethers of a dihydroxyl compound such as the aforesaid low molecular weight diol and dihydric phenols. Among the dihydric phenols are bisphenols, e.g., bisphenols A and bisphenols S, and mono-nuclear dihydric phenols e.g., catechol and hydroquinone.

Suitable oxyalkylene ethers can be obtained by adding one or more alkylene oxides to a dihydroxyl compound. Suitable alkylene oxides include ones containing 2–8 carbon atoms, for example, ethylene oxide (hereafter, referred to as "EO"), propylene oxide (hereafter, referred to as "PO"), 1,2-butylene oxide, 1,3-butylene oxide, 1,4-butylene oxide, 2,3-butylene oxide and styrene oxide, and combinations of two or more of these compounds, which may be added blockwise and/or randomwise.

Of those polyether diols, preferable are ones with alkylene oxide added to a low molecular weight aliphatic diol, and more preferable ones with PO added.

Of those high molecular weight diols (a2), preferable are polyester diols, and more preferable polyester diols derived from a low molecular weight branched aliphatic diol and a dicarboxylic acid, still more preferable polyneopentyl adipate diol, in view of providing excellent soft touch.

The number average molecular weight of (a2) is 500 to 20,000, and preferably 1,000 to 10,000, and more preferably 1,000 to 5,000. Soft touch is not obtained in case the number average molecular weight lower than 500, while the required strength is not attained when it is higher than 10,000.

It is possible to use a low molecular weight diol (a3) combination with the high molecular weight diol (a2) as necessary. Suitable as (a3) are the compounds cited as starting materials for polyester diol.

Suitable non-aromatic diamines (a4) of (A) include cycloaliphatic diamines such as 4,4'-diamino-3,3'-dimethyldic clohexylmethane, 1,4-diaminocyclohexane, isophoronediamine; aliphatic diamines such as ethylenediamine, hexanediamine; and araliphatic diamines such as xylylenediamine, α, α, α', α'-tetramethylxylylenediamine. Among these compounds preferred are cycloaliphatic diamines and aliphatic diamines, particularly isophoronediamine and hexamethylenediamine.

A constituent monoamine (a5) of (A) can have one or two hydroxyalkyl group(s) containing 2–4 carbon atoms. Examples of the monoamine (a5) include monoalkanolamines such as monoethanolamine, monopropanolamine, and the like, and dialkanolamines such as diethanolamine, dipropanolamine, and the like. Among these compounds, preferred are dialkanolamines, particularly diethanolamine.

The powdered (A) of the present invention can be produced in the following methods:

1̂: (a1), (a2), (a4), (a5) and optionally (a3) are reacted in one shot into (A) in a solid form such as pellet, which is then freeze crushed into powdered (A).

2̂: (a1), (a2) and optionally (a3) are reacted beforehand to form an NCO-terminated urethane prepolymer, which is then reacted with (a4) and (a5) into (A) in a solid form such as pellet. The product is then freeze crushed into powdered (A).

3̂: (a1), (a2), (a4), (a5) and optionally (a3) are suspension polymerized in one shot in an organic solvent which does not dissolve (A), followed by removing the solvent and dried to give powdered (A).

4̂: (a1), (a2) and optionally (a3) are reacted beforehand to form an NCO-terminated urethane prepolymer, which is then dispersed in a solvent which does not dissolve (A). To this, (a4) and (a5) are added to effect a suspension polymerization, followed by removal of the solvent and drying to obtain powdered (A).

5̂: (a1), (a2), (a4), (a5) and optionally (a3) are suspension polymerized in one shot in water. The product is then dried to give powdered (A).

6̂: (a1), (a2) and, optionally, (a3) are reacted beforehand to form an NCO-terminated urethane prepolymer, which is then suspension polymerized with (a4) and (a5) in water, followed by drying to obtain powdered (A).

Suitable organic solvents used in 3̂ and 4̂ include, for example, n-hexane, n-heptane, cyclohexane and the like.

Among these preparation methods, preferred are 2̂, 4̂ and 6̂, particularly 6̂ from the viewpoint of industrial production.

The urethane-forming reaction process is not particularly restricted, and can be effected by known methods. There may be used known urethane-forming catalysts, including amine catalysts and organic metal catalysts such as tin compound.

The molar ratio of the respective constituent parts making up (A) to 1 mole of (a1) is this: (a2) generally 0.1 to 0.5 mole, and preferably 0.2 to 0.4 mole; (a3) generally 0 to 0.2 mole, and preferably 0.05 to 0.15 mole, (a4) generally 0.2 to 0.7 mole, and preferably 0.3 to 0.6 mole; and (a5) generally 0.02 to 0.2 mole, and preferably 0.05 to 0.15 mole.

In the methods 2̂, 4̂ and 6̂, the content of the isocyanate group of the urethane prepolymer is generally 1 to 10 percent by weight, and preferably 3 to 6 percent by weight.

Among the plasticizers (B) suitable in the present invention are phthalate esters, e.g., dibutyl phthalate (SP: 9.4), dioctyl phthalate (SP: 8.9), butyl benzyl phthalate (SP: 8.9), di-isodecyl phthalate (SP: 8.2); aliphatic dibasic acid esters, e.g., di-2-ethyl hexyl adipate (SP: 8.6), 2-ethyl hexyl sebacate (SP: 8.6); trimellitate esters, e.g., tri-2-ethyl hexyl trimellitate (SP: 9.2), tri-octyl trimellitate (SP: 9.5); phosphate esters, e.g., tri-2-ethyl hexyl phosphate (SP: 9.2), tricresyl phosphate (SP: 9.9); fatty acid esters, i.e., butyl oleate (SP: 9.0). Those compounds are used alone or as a mixture of two or more thereof.

Among these compounds, preferred are di-isodecyl phthalate, tri-2-ethylhexyl trimellitate and tri-isodecyl trimellitate.

The difference between (B) and (A) in SP is generally not larger than 1.5, and preferably not larger than 1.0. If the SP difference between (B) and (A) is larger than 1.5, the compatibility between (B) and (A) will deteriorate and can cause the plasticizer to bleed out of the slush molded surface skin.

The blocked polyisocyanate (C) comprises a polyisocyanate (c1) blocked with a blocking agent (c2). (c1) is at least one isocyanate selected from among diisocyanates mentioned as example of (a1) and their modified products, e.g., ones containing isocyanurate, biuret and carbodiimide.

The number of isocyanate groups is generally 2 or more, preferably 3 to 4. Among these compounds, preferred are isocyanurate-modified isophorone diisocyanate, isocyanurate-modified hexamethylene diisocyanate and biuret-modified hexamethylene diisocyanate.

Among (c2) are oximes, e.g., acetoxime, butanonoxime and methyl ethyl ketone oxime; lactams, e.g., γ-outyrolactam, ε-caprolactam and γ-valerolactam; alcohols/phenols, e.g., ethanol, methanol, phenol and m-cresol; active methylene compounds, e.g., ethyl acetoacetate; basic nitrogen-containing compounds, e.g., N, N-diethyl hydroxylamine, 2-hydroxypyridine, pyridine N-oxide, 2-mercaptopyridine.

Among the blocking agent (c2), preferred are lactams, particularly ε-caprolactam.

The pigments (D) that can be used in the present invention are not restricted in particular and known organic pigments and/or inorganic pigments can be used.

Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, sulfide selenium compounds, sulfate, silicate, carbonate, phosphate, metallic powder and carbon black.

DESCRIPTION OF THE PREFERRED EMBODIMENTS

Now the present invention will be described in more detail by the following examples but is by no means restricted thereto. In the following description, it is understood, part or parts mean part or parts by weight and percent denotes percent by weight. The raw materials used are supplied by the following manufacturers under the following brandnames. [Raw material//Brandname//Manufacturer]

Polycaprolactone diol//PLACCEL L220A//DAICEL CHEMICAL DUSTRIES, LTD.

ε-caprolactam blocked trimer of IPDI//VESTAGON 1530//HULS JAPAN Ltd.

Polyvinyl alcohol//PVA-235//KURARAY CO., LTD.

Anti-blocking agent//SILYSIA 978//FUJI SILYSIA CHEMICAL Ltd.

Polyethylene adipate diol//SANESTOR 2610//SANYO CHEMICAL INDUSTRIES, LTD.

Light stabilizer//DIC-TBS//DAINIPPON INIK AND CHEMICALS, INC.

Neopentyl adipate diol//SANESTOR 5620//SANYO CHEMICAL INDUSTRIES, LTD.

Titanium oxide//TIPAQUE R-820//ISHIHAPA SANGYO KAISYA, LTD.

Carbon black//#5500F//TOKAI CARBON CO.,LTD.

PREPARATION EXAMPLE 1

820 parts of polycaprolactone diol with Mn of 2,000 and a hydroxyl value of 56 was placed in a four-necked flask with a stirrer and a thermometer mounted therein and dehydrated under heating for one hour at 110° C. under a vacuum pressure of 3 mmHg. Then 120 parts of IPDI was added and the mixture was allowed to react for 10 hours at 110° C. to give an NCO-terminated urethane prepolymer. The urethane prepolymer was found to contain 3.4 percent of free isocyanate group. This shall be called "Prepolymer (1)."

PREPARATION EXAMPLE 2

230 parts of Prepolymer (1) and 10 parts of ε-caprolactam blocked trimer of IPDI were placed and mixed in a beaker, followed by adding thereto 750 parts of a dispersion medium comprising water and 3 parts of polyvinyl alcohol dissolved therein. The resulting mixture was then stirred for one minute with an ultra disperser (manufactured by YAMATO SCIENTIFIC Ltd.) at 9,000 rpm.

The mixture was transferred into a four-necked flask mounted with a stirrer and a thermometer, and 15 parts of isophorone diamine and 1.5 parts of diethanol amine were added thereto under stirring and allowed to react for 10 hours at 50° C. The reaction product was then filtered and dried to obtain a powdery urethane elastomer having Mn of 40,000, Tg of −48° C. and SP of 10.5. The elastomer was mixed with one part of anti-blocking agent and 0.5 part of light stabilizer to prepare an urethane elastomer powder (F1).

PREPARATION EXAMPLE 3

The following ingredients were first mixed in a beaker: 160 parts of polyethylene adipate diol with Mn of 1,000 and a hydroxyl value of 112, 50 parts of hexamethylene diisocyanate, 15 parts of hexamethylene diamine, 1.5 parts of monoethanol amine and 10 parts of ε-capcolactam blocked trimer of IPDI, followed by adding thereto 750 parts of a dispersion medium comprising water and 3 parts of polyvinyl alcohol dissolved therein and mixing for one minute with the ultra disperser at 9,000 rpm.

The mixture was transferred into a four-necked flask mounted with a stirrer and a thermometer, and was allowed to react for 10 hours at 50° C. The reaction product was then filtered and dried, to obtain a powdery urethane elastomer having Mn of 20,000, Tg of −48° C. and SP of 10.8. The elastomer was mixed with one part of anti-blocking agent (silica) and 0.5 part of light stabilizer to prepare an elastomer powder (F2).

PREPARATION EXAMPLE 4

820 parts of neopentyl adipate diol with Mn of 2,000 and a hydroxyl value of 56 was placed in a four-necked flask with a stirrer and a thermometer mounted therein and dehydrated under heating for one hour at 110° C. under a vacuum pressure of 3 mmHg. Then 120 parts of IPDI was added and the mixture was allowed to react for 10 hours at 110° C. to give an NCO-terminated urethane prepolymer. The urethane prepolymer was found to contain 3.4 percent of free isocyarate group. This shall be called "Prepolymer (3)."

PREPARATION EXAMPLE 5

230 parts of Prepolymer (3) and 10 parts of ε-caprolactam blocked trimer of IPDI were placed and mixed in a beaker, followed by adding thereto 750 parts of a dispersion medium comprising water and 3 parts of polyvinyl alcohol dissolved therein. The resulting mixture was then stirred for one minute with the ultra disperser at 9,000 rpm.

The mixture was transferred into a four-necked flask mounted with a stirrer and a thermometer, and 15 parts of isophorone diamine and 1.5 parts of diethanol amine were added thereto while stirring and allowed to react for 10 hours at 50 ° C. The reaction product was then filtered and dried, to obtain a powdery urethane elastomer having Mn of 40,000, Tg of −55° C. and SP of 10.3. The elastomer was mixed with one part of anti-blocking agent and 0.5 part of light stabilizer to prepare an elastomer powder (F3).

EXAMPLE 1

100 parts of (F1), 5 parts of di-octyl adipate and 1 part of titanium oxide were placed in a Henschel mixer and mixed for one minute at 200 rpm. After that, the mixture was allowed to mature for one hour at 100° C. and then to cool to 40 ° C. Then one part of anti-blocking agent was added to obtain a slush molding composition (S1) of the present invention.

EXAMPLE 2

100 parts of (F2), 7 parts of di-butyl sebacate and 1 part of titanium oxide were placed in a Henschel mixer and mixed for one minute at 200 rpm. After the same subsequent procedure as in Example 1 was obtained another slush molding composition (S2) of the present invention.

EXAMPLE 3

100 parts of (F3), 5 parts of di-isodecyl phthalate and parts of carbon black were placed in a Henschel mixer and mixed for one minute at 200 rpm. After the same subsequent procedure as in Example 1 was obtained still another slush molding composition (S3) of the present invention.

EXAMPLE 4

100 parts of (F3), 5 parts of di-isodecyl phthalate, 5 parts of tri-2-ethylhexyl trimellitate an(d 1 part of titanium oxide were placed in a Henschel mixer and mixed for one minute at 200 rpm. After the same subsequent procedure as in Example 1 was obtained a further slush molding composition (S4) of the present invention.

Testing 1

The compositions (S1), (S2), (S3) ard (S4) obtained in Examples 1 to 4 were tested along with a commercially available slush molding PVC powder "S 130" (Sumitomo Chemical Co., Ltd., Japan)—(S5)—as comparative example. Each sample was brought into contact with a mold heated to 220 ° C. for 10 seconds. After hot melting, the unmelted powder was removed out of the melt, which was left standing for one minute at room temperature and cooled in water to give a molded sheet. The molded sheets thus obtained were put to the following tests to examine the properties. The test results are summarized in Table 1.

Breaking strength and elongation (25° C.) low-temperature breaking strength (-35° C.), hardness: ASTM-D638

Fogging: A sample 50×50 mm was placed in a glass container with a ground mouth. With a glass plate put thereon, the container was placed in an oil bath maintained at 100° C. 20 hours after that, the degree of fogging was measured in accordance with ASTM-D5393.

TABLE 1

|  | Example | | | | Comparative example |
|---|---|---|---|---|---|
|  | 1 | 2 | 3 | 4 |  |
| Slush molding composition | S1 | S2 | S3 | S4 | S5 |
| Elongation, % | 420 | 350 | 520 | 620 | 300 |
| Breaking strength, MPa | 12 | 10 | 12 | 10 | 10 |
| Low-temp. elongation, % | 200 | 175 | 350 | 320 | 80 |
| Low-temp. breaking strength, MPa | 22 | 20 | 22 | 20 | 25 |
| Hardness (Shore-A) | 75 | 83 | 65 | 68 | 83 |
| Fogging, % | 5 | 5 | 5 | 5 | 6 |

Table 1 shows that the compositions of Examples are superior to the comparative example in low-temperature elongation.

Testing 2

Molded sheets were prepared from (S1) to (S5) within the mold in accordance with Testing 1, followed by introducing thereinto urethane foam-forming components of the following formulation to obtain urethane foams with the surface layers of the respective molded sheets (S1) to (S5).

Formulation: 95 parts of an EO-chipped polyoxypropylene triol having Mn of 5,000, 5 parts of triethanol amine, 2.5 parts of water, 1 part of triethylamine anci 61.5 parts of a polymeric MDI.

Those moldings were heat treated in a circulating-air drier for 500 hours at 120° C. Then the urethane foams were removed from the respective molded sheets, which were then put to the following tests of the following physical properties. The test results are shown in Table 2.

Elongation (25° C., -35 ° C): ASTM-D638
Change in shade: Visual evaluation

TABLE 2

|  | Example | | | | Comparative example |
|---|---|---|---|---|---|
|  | 1 | 2 | 3 | 4 |  |
| Slush molding composition | S1 | S2 | S3 | S4 | S5 |
| Elongation % after heat treatment (25° C.) | 400 | 370 | 500 | 570 | 10 |
| Elongation % after heat treatment (-35° C.) | 105 | 91 | 320 | 310 | 0 |
| Change in shade | o | o | o | o | x |

Basis for evaluation of change in shade:
o No change in shade is observed.
x A change in shade is caused.

Testing 3

The urethane foams with the respective surface layers—(S1) to (S5)—obtained in Testing 2 were tested in a carbon arc fadeometer for 400 hours at a black panel temperature of 83 ° C. Then the urethane foams were removed from the respective molded sheets, which were then put to the following tests of the following physical properties. The test results are shown in Table 3.

Elongation (25 ° C, -35° C.) : ASTM-D638
Change in shade: Visual evaluation

TABLE 3

|  | Example | | | | Comparative example |
|---|---|---|---|---|---|
|  | 1 | 2 | 3 | 4 |  |
| Slush molding composition | S1 | S2 | S3 | S4 | S5 |
| Elongation % subjected to fadeometer (25° C.) | 400 | 370 | 500 | 570 | 10 |
| Elongation % subjected to fadeometer (-35° C.) | 105 | 91 | 320 | 310 | 0 |
| Change in shade | o | o | o | o | x |

Basis for evaluation of change in shade:
o No change in shade is observed.
x A change in shade is caused.

As shown in Tables 2 and 3, the molded sheets from the compositions of the present invention not only undergo no change in shade after heat treatment and treatment in the fadeometer but also is still large in elongation as compared with the comparative one. It is clear, therefore, that the invention compositions are excellent in thermal aging resistance and light aging resistance.

What is claimed is:

1. A molded article, which is obtained by slush-molding a composition comprising:
   a thermoplastic polyurethane elastomer (A) having a number-average molecular weight of 20,000 to 50,000 and a glass transition point not higher than -35° C.,
   a plasticizer (B) comprising at least one selected from the group consisting of phthalate esters aliphatic dibasic acid esters, trimellitate esters, phosphate esters and fatty acid esters,
   a blocked polyisocyanate (C), and
   a pigment (D);
   (B), (C) and (D) being present in an amount of 1 to 20 parts by weight, 1 to 20 parts by weight and 0.5 to 3 parts by weight, respectively, per 100 parts by weight of (A).

2. The molded article of claim 1, wherein said elastomer (A) has at least one hydroxyl group.

3. The molded article of claim 1, wherein said elastomer (A) is obtained by reacting a non-aromatic diisocyanate (a1) with a high molecular weight diol (a2), a non-aromatic diamine (a4) and monoamine (a5) having one or two hydroxyl groups, with or without a low molecular weight diol (a3).

4. The molded article of claim 1, where(in said elastomer (A) is obtained by reacting
   an NCO-terminated urethane prepolymer with a non-aromatic diamine (a4), and a monoamine (a5) having one or two hydroxyalkyl groups containing 2–4 carbon atoms; said urethane prepolymer having been derived from a non-aromatic diisocyanate (a1), and a high molecular weight diol (a2) having a number average molecular weight of 500 to 20,000, with or without a low molecular weight diol (a3).

5. The molded article of claim 3, wherein the high molecular weight diol (a2) is a polyester diol, said polyester diol being a polyester of a branched aliphatic diol with a dicarboxylic acid.

6. The molded article of claim 5, wherein the polyester diol is a poly(neopentyl adipate) diol.

7. The molded article of claim 1, wherein said elastomer (A) has a Shore-A hardness of 55–75 at 25° C.

8. The molded article of claim 1, wherein the difference between (A) and (B) in solubility parameter is not more than 1.5.

9. The molded article of claim 1, wherein the blocked polyisocyanate (C) is obtainable by reacting a lactam with at least one polyisocyanate selected from the group consisting of cycloaliphatic polyisocyanates, aliphatic polyisocyanates and araliphatic polyisocyanates.

10. The molded article of claim 1, wherein the composition is a powder having an average particle diameter of 100–300 μm and containing particles with a particle diameter less than 100 μm in a quantity of not more than 20% by weight.

11. A process for producing a molded article, which comprises slush-molding a composition comprising:
- a thermoplastic polyurethane elastomer (A) having a number-average molecular weight of 20,000 to 50,000 and a glass transition point not higher than −35° C.,
- a plasticizer (B) comprising at least one selected from the group consisting of phthalate esters aliphatic dibasic acid esters, trimellitate esters, phosphate esters and fatty acid esters, a blocked polyisocyanate (C), and
- a pigment (D);
- (B), (C) and (D) being present in an amount of 1 to 20 parts by weight, 1 to 20 parts by weight and 0.5 to 3 parts by weight, respectively, per 100 parts by weight of (A).

12. The process of claim 11, wherein said elastomer (A) has at least one hydroxyl group.

13. The process of claim 11, wherein said elastomer (A) is obtained by reacting
- an NCO-terminated urethane prepolymer with a non-aromatic diamine (a4), and a monoamine (a5) having one or two hydroxyalkyl groups containing 2–4 carbon atoms; said urethane prepolymer having been derived from a non-aromatic diisocyanate (a1), and a high molecular weight diol (a2) having a number average molecular weight of 500 to 20,000, with or without a low molecular weight diol (a3).

14. The process article of claim 13, wherein the high molecular weight diol (a2) is a polyester diol, said polyester diol being a polyester of a branched aliphatic diol with a dicarboxylic acid.

15. The process article of claim 14, wherein the polyester diol is a poly(neopentyl adipate) diol.

16. The process of claim 11, wherein said elastomer (A) has a Shore-A hardness of 55–75 at 25° C.

17. The process of claim 11, wherein the difference between (A) and (B) in solubility parameter is not more than 1.5.

18. The process of claim 11, wherein the blocked polyisocyanate (C) is obtained by reacting a lactam with at least one polyisocyanate selected from the group consisting of cycloaliphatic polyisocyanates, aliphatic polyisocyanates and araliphatic polyisocyanates.

19. The process of claim 11, wherein the composition is a powder having an average particle diameter of 100–300 μm and containing particles with a particle diameter less than 100 μm in a quantity not more than 20% by weight.

* * * * *